United States Patent Office 3,631,070
Patented Dec. 28, 1971

3,631,070
TETRAHYDROFURYL ETHERS OF STEROIDS AND PREPARATION THEREOF
Alexander Mebane, New York, N.Y., assignor to Ortho Pharmaceutical Corporation
No Drawing. Continuation-in-part of application Ser. No. 530,412, Feb. 28, 1966. This application Mar. 9, 1967, Ser. No. 622,870
Int. Cl. C07c *173/00*
U.S. Cl. 260—239.55 R            7 Claims

ABSTRACT OF THE DISCLOSURE

The present invention relates to novel steroidal tetrahydrofuryl ethers and the process for their preparation. More particularly, the present invention relates to 3-(tetrahydro-2'-furyl) ethers having antilittering activity and 17-(tetra-hydro-2'-furyl) ethers of steroids and the process for their preparation.

The present application is a continuation-in-part of my application Ser. No. 530,412 filed Feb. 28, 1966.

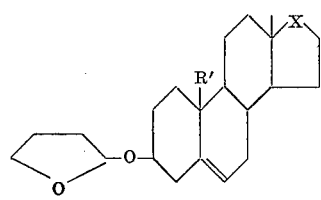

I

The novel compounds of the present invention are represented by the following formulae:

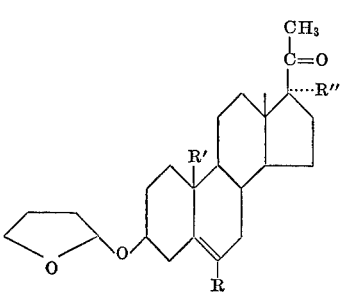

III

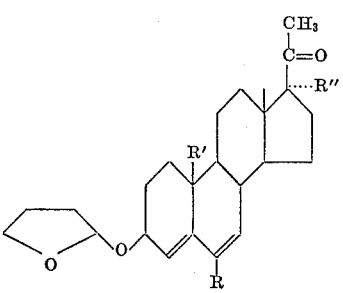

IV

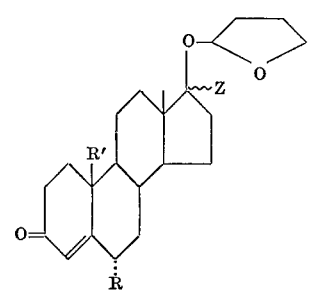

V

In the above formulae, R represents hydrogen, methyl, ethyl, chlorine or fluorine, R' represents hydrogen or methyl, R" represents hydrogen, hydroxyl, lower alkoxy, or lower acyloxy, X represents CH—OH or C=O, Z represents hydrogen or acetyl and $\xi$ represents the $\beta$ configuration when Z is acetyl and the $\alpha$ configuration when Z is hydrogen.

The novel compounds of the present invention are prepared by reacting a 3-hydroxylated or 17-hydroxylated steroid in a solvent with at least 1 equivalent of 2,3-dihydrofuran or a tetrahydro-2'-furyl ester and a catalytic quantity of an acid. After the reaction is complete, the acid is neutralized. The reaction products may be recrystallized from a solvent, preferably containing a trace of a suitable alkaline material such as pyridine. When the reaction production contains a keto group, the ketone may be reduced by hydroxyl by reaction with sodium borohydride.

The compounds of the present invention are useful as intermediates in reactions conducted under non-acidic conditions since the tetrahydrofuryl ether group acts to protect the hydroxyl group which it replaces. Acid hydrolysis will regenerate the hydroxy group. In addition, compounds of Formulae I through IV are effective antilittering agents for the suppression of animal reproduction, and compounds of formula V posses androgenic activity.

The following examples describe the invention in greater particularity and are intended to be way of illustration and not limitation.

EXAMPLE I

17$\beta$-(tetrahydro-2'-furoxy)-4-amdrosten-3-one

To a 50-ml.-Erlenmeyer flask are added 2.9 grams of testosterone, 15 ml. of dichloroethane, 1.75 grams of 2,3-dihydrofuran and about ½ drop of concentrated hydrochloric acid. The flask is loosely stoppered with a polyethylene stopper and is swirled while being heated to 50° C. The flask is then tightly stoppered and is permitted to stand for 12 hours at 50° C. The solution is cooled, made alkaline by the addition of 0.1 ml. of N-ethylmorpholine, and shaken in a separatory funnel with 15 ml. of methylene chloride and 60 ml. of ammoniacal water. The organic layer is filtered through anhydrous potassium carbonate and is vacuum concentrated to obtain a crude product which after recrystallization from methanol-water gives 56% first-crop yield of 17$\beta$-(tetrahydro-2'-furoxy)-4-androsten-3-one in the form of fragments of rectangular prisms, M.P. 137–144°.

EXAMPLE II

3$\beta$-(tetrahydro-2'-furoxy)-5-androsten-17-one

Following the procedure of Example I, but starting with androstenolone and carrying out the reaction for 2½ hours, there is obtained upon recrystallization from ethanol-water an 81% first-crop yield of 3$\beta$-(tetrahydro-2'-furoxy)-5-androsten-17-one in the form of white, fluffy crystals, M.P. 164–167°.

EXAMPLE III

3$\beta$-(tetrahydro-2'-furoxy)-6$\alpha$-methyl-17$\alpha$-acetoxy-4-pregnen-20-one Following the procedure of Example I, but starting with 6$\alpha$-methyl-17$\alpha$-acetoxy-4-pregnenolone, and allowing the reaction to proceed at room temperature after initial warming, there is obtained after recrystallization from cold hexane followed by methanol-water a 42% yield of 3$\beta$ - (tetrahydro-2'-furoxy)-6$\alpha$-methyl-17$\alpha$-acetoxy-4-pregnen-20-one in the form of minute stout prisms, M.P. 151–158°. The NMR spectrum of this product verified the presence of the 4-double bond.

EXAMPLE IV

6α-methyl-17α-(tetrahydro-2'-furoxy)-progesterone

Following the procedure of Example I, but starting with 6α-methyl-17α-hydroxyprogesterone and allowing 24 hours reaction time, there is obtained by trituration with cold ether followed by recrystallization from aqueous methanol a 7½% first-crop yield of 6α-methyl-17α-(tetrahydro-2'-furoxy)-progesterone in the form of needles, M.P. 164–166.5°.

Utilizing the procedure of Examples I to IV, but starting with the appropriate hydroxyl containing compounds, there are prepared:

19-nor-3β-(tetrahydro-2'-furoxy)-5-androstene-17-one,
19-nor-3β-(tetrahydro-2'-furoxy)-5-androstene-17β-ol,
17α-acetoxy-3β-(tetrahydro-2'-furoxy)-4-pregnen-20-one,
17α-caproxy-3β-(tetrahydro-2'-furoxy)-4-pregnen-20-one,
6α-ethyl-17α-acetoxy-3β-(tetrahydro-2'-furoxy)-4-pregnen-20-one,
6α-chloro-17α-acetoxy-3β-(tetrahydro-2'-furoxy)-4-pregnen-20-one,
6α-fluoro-17α-acetoxy-3β-(tetrahydro-2'-furoxy)-4-prenen-20-one,
19-nor-6α-methyl-17α-acetoxy-3β-(tetrahydro-2'-furoxy)-4-pregnen-20-one,
6α-methyl-17β-(tetrahydro-2'-furoxy)-4-androsten-3-one,
6α-fluoro-17β-(tetrahydro-2'-furoxy)-4-androsten-3-one,
6α-chloro-17α-(tetrahydro-2'-furoxy)-4-androsten-3-one,
6-methyl-17α-acetoxy-3β-(tetrahydro-2'-furoxy)-5-pregnen-20-one,
6-ethyl-17α-acetoxy-3β-(tetrahydro-2'-furoxy)-5-pregnen-20-one,
6-chloro-17α-acetoxy-3β-(tetrahydro-2'-furoxy)-5-pregnen-20-one,
6-fluoro-17α-acetoxy-3β-(tetrahydro-2'-furoxy)-5-pregnen-20-one,
19-nor-6-methyl-17α-acetoxy-3β-(tetrahydro-2'-furoxy)-5-pregnen-20-one,
19-nor-6-ethyl-17α-acetoxy-3β-(tetrahydro-2'-furoxy)-5-pregnen-20-one,
19-nor-6-chloro17α-acetoxy-3β-(tetrahydro-2'-furoxy)-5-pregnen-20-one,
19-nor-6-fluoro17α-acetoxy-3β-(tetrahydro-2'-furoxy)-5-pregnen-20-one,
6-methyl-17α-acetoxy-3β-(tetrahydro-2'-furoxy)-4,6-pregnen-20-one,
6-ethyl-17α-acetoxy-3β-(tetrahydro-2'-furoxy)4,6-pregnen-20-one,
6-chloro-17α-acetoxy-3β-(tetrahydro-2'-furoxy)-4,6-pregnen-20-one,
6-fluoro-17α-acetoxy-3β-(tetrahydro-2'-furoxy)-4,6-pregnen-20-one,
19-nor-6-methyl-17α-acetoxy-3β-(tetrahydro-2'-furoxy)-4,6-pregnen-20-one,
19-nor-6-ethyl-17α-acetoxy-3β-(tetrahydro-2'-furoxy)-4,6-pregnen-20-one,
19-nor-6-chloro-17α-acetoxy-3β-(tetrahydro-2'-furoxy)-4,6-pregnen-20-one,
19-nor-6-fluoro-17α-acetoxy-3β-(tetrahydro-2'-furoxy)-4,6-pregnen-20-one,
6-methyl-3β-(tetrahydro-2'-furoxy)-5-pregnen-20-one,
6-ethyl-3β-(tetrahydro-2'-furoxy)-5-pregnen-20-one,
6-chloro-3β-(tetrahydro-2'-furoxy)-5-pregnen-20-one,
6-fluoro-3β-(tetrahydro-2'-furoxy)-5-pregnen-20-one,
6-methyl-3β-(tetrahydro-2'-furoxy)-4,6-pregnen-20-one,
6-ethyl-3β-(tetrahydro-2'-furoxy)-4,6-pregnen-20-one,
6-chloro-3β-(tetrahydro-2'-furoxy)-4,6-pregnen-20-one,
6-fluoro-3β-(tetrahydro-2'-furoxy)-4,6-pregnen-20-one.

EXAMPLE V

3β-(tetrahydro-2'-furoxy)-5-androstene-17-one 11.6 grams of androstenolone, 50 ml. of dry 1,2-dimethoxy-ethane, 11.7 grams of tetrahydro-2'-furyl benzoate and one drop of concentrated hydrochloric acid are mixed in a 250 ml. suction flask. The flask is swirled while being heated to 50° C. and is then stoppered and permitted to stand for 15 hours at 50° C. To neutralize acids, 8 ml. of N-ethyl-morpholine is added, followed by 50 ml. of ammoniacal water. The mixture is refrigerated for one hour and then filtered, washing the cream-white microcrystalline powder with ammoniacal water. Upon recrystallization from 95% ethanol, there is obtained as a first-crop 73% of 3β-(tetrahydro-2'-furoxy)-5-androsten-17-one in the form of white needles, M.P. 164–167°.

EXAMPLE VI

3β-(tetrahydro-2'-furoxy)-5-androstene-17β-ol 4.4 grams of 3β-(tetrahydro-2'-furoxy)-5-androstene-17-one (prepared by the method of Example II or Example V), 0.4 grams of sodium borohydride and 50 ml. of absolute ethanol containing a drop of triethylamine are placed in a 125 ml. flask and heated at 60° for ½ hour, followed by precipitation with 120 ml. of ammoniacal water. There is obtained after recrystallization from aqueous methanol yielded 2.6 grams of 3β-(tetrahydro-2'-furoxy)-5-androstene-17β-ol in the form of white hairlike fibrous needles, M.P. 146.5–147.5°.

What is claimed is:

1. A compound selected from the group consisting of:

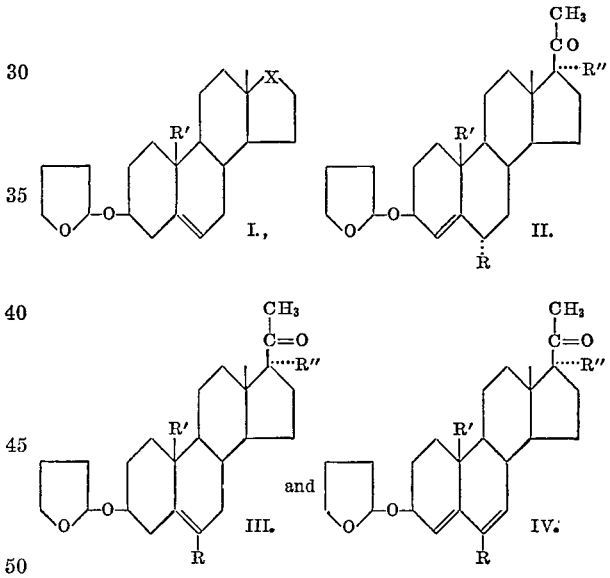

wherein R is selected from the group consisting of hydrogen, methyl, ethyl, chlorine and fluorine, R' is selected from the group consisting of hydrogen and methyl, R'' is selected from the group consisting of hydrogen, hydroxyl, lower alkoxy and lower acyloxy, and X is selected from the group consisting of CH—OH and C=O.

2. A compound of the formula

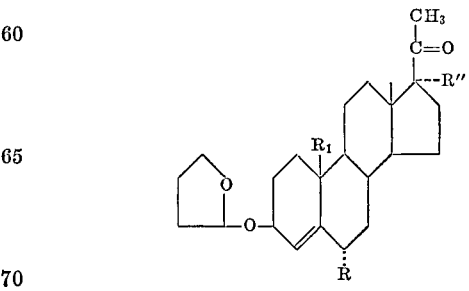

wherein R is selected from the group consisting of hydrogen, methyl, chloro and fluoro; R' is selected from the group consisting of hydrogen and methyl; and R'' is selected from the group consisting of hydrogen, hydroxy and lower hydrocarbon acyloxy; and the corresponding 6-dehydro derivatives thereof.

3. A compound of the formula:

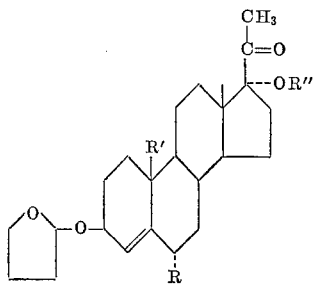

wherein R is selected from the group consisting of hydrogen, methyl, chloro and fluoro; R' is selected from the group consisting of hydrogen and methyl; and R'' is lower hydrocarbon acyl; and the corresponding 6-dehydro derivatives thereof.

4. 17α-lower acyloxy-6α-methyl - 3β - (tetrahydro-2'-furoxy)-4-pregnen-20-one, according to claim 1.

5. 17α-acetoxy-6α-methyl-3β-(tetrahydro-2'-furoxy)-4-pregnen-20-one, according to claim 1.

6. 3β-(tetrahydro-2'-furoxy)-5-androstene-17 - one, according to claim 2.

7. 3β-(tetrahydro-2'-furoxy) - 5 - androstene-17β-ol, according to claim 1.

References Cited
UNITED STATES PATENTS

| | | | |
|---|---|---|---|
| 3,109,850 | 11/1963 | Wettstein et al. | 260—397.5 |
| 3,115,440 | 12/1963 | Ercoli | 167—74 |
| 3,253,003 | 5/1966 | Wettstein et al. | 260—397.4 |

LEWIS GOTTS, Primary Examiner

E. G. LOVE, Assistant Examiner

U.S. Cl. X.R.

260—999

PO-1050
(5/69)

UNITED STATES PATENT OFFICE
CERTIFICATE OF CORRECTION

Patent No. 3,631,070          Dated December 28, 1971

Inventor(s) Alexander Mebane

It is certified that error appears in the above-identified patent and that said Letters Patent are hereby corrected as shown below:

In Column 1, The Abstract of the Disclosure should read ---- The present invention relates to novel steroidal tetrahydrofuryl ethers having antilittering activity and the process for their preparation. More particularly, the present invention relates to 3-(tetrahydro-2'-furyl) ethers and 17-(tetrahydro-2'-furyl) ethers of steroids and the process for their preparation -----.

Signed and sealed this 30th day of May 1972.

(SEAL)
Attest:

EDWARD M. FLETCHER, JR.      ROBERT GOTTSCHALK
Attesting Officer               Commissioner of Patents